March 31, 1959 C. A. NICKERSON 2,880,279

SOUND RECORDING AND REPRODUCING APPARATUS

Filed June 12, 1953 2 Sheets-Sheet 1

INVENTOR
C. A. NICKERSON
BY V. P. Triolo
ATTORNEY

March 31, 1959 C. A. NICKERSON 2,880,279

SOUND RECORDING AND REPRODUCING APPARATUS

Filed June 12, 1953 2 Sheets-Sheet 2

INVENTOR
C. A. NICKERSON
BY V. P. Priolo
ATTORNEY

United States Patent Office 2,880,279
Patented Mar. 31, 1959

2,880,279

SOUND RECORDING AND REPRODUCING APPARATUS

Clifford A. Nickerson, Bernardsville, N.J., assignor to Bell Telephone Laboratories, Incorporated, New York, N.Y., a corporation of New York Application June 12, 1953, Serial No. 361,242

2 Claims. (Cl. 179—100.2)

This invention relates to sound recording and reproducing apparatus, particularly to apparatus comprising magnetizable record media, and more particularly to apparatus comprising a magnetizable record medium provided on its outer surface with a helical groove which serves as a lead screw.

It is an object of this invention to provide a magnetic recording and reproducing apparatus in which the record member comprises a plurality of separate message areas and means for causing a transducer to traverse said areas.

A feature of the invention resides in the surface of the record member which comprises a permanent message area and an erasable temporary message area separated by a guard area of sufficient width to prevent erasure of the permanent message area, and means for causing a transducer associated therewith to traverse the permanent and temporary message areas at a specified speed and the guard area at a greater speed.

The nature of the invention and its distinguishing features and advantages will be more clearly understood from the following detailed description and the accompanying drawings in which.

Figures 1, 4:
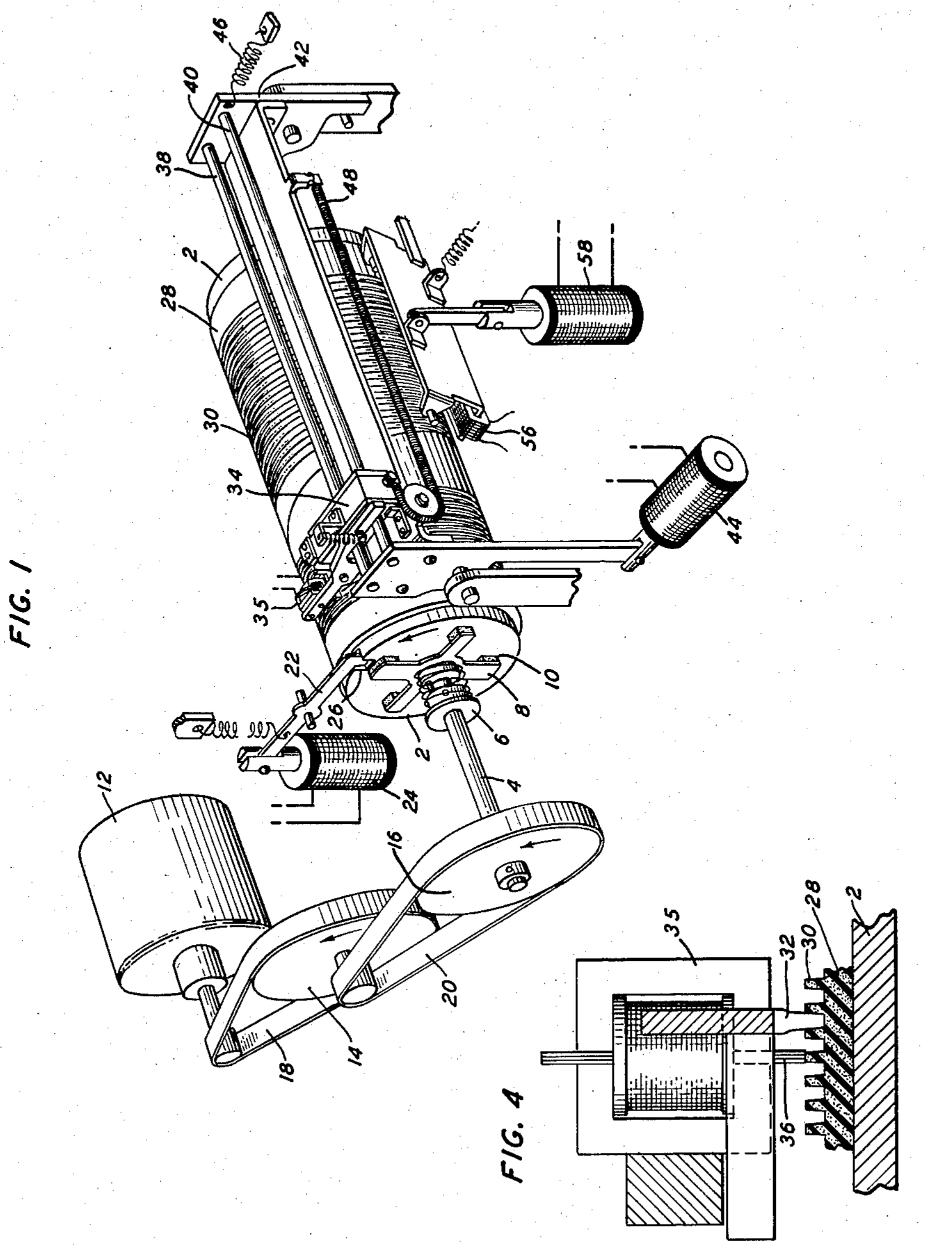
Fig. 1 is a view in perspective of a preferred embodiment of the invention.
Fig. 4 is a sectional view taken on the line 4—4 of Fig. 3.

Referring now to the accompanying drawings, 2 is a record drum which may be made of a material such as aluminum. It is assembled on a shaft 4 on bearings contained in the drum and is driven from the shaft by means of a constant torque clutch, the collar 6 of which is fixedly attached to the shaft 4 and the plate 8 of which comprises a compliant member 10 which is in constant frictional engagement with the drum. The shaft 4 is driven by a motor 12 by means of a double set of pulleys 14 and 16 through two belts 18 and 20. This arrangement for driving the drum is similar to the arrangement disclosed in patent application Serial No. 331,157 filed on January 14, 1953. Rotation of the drum is prevented by means of a pawl 22 which, when actuated by the solenoid 24, falls into a notch 26 in the drum.

On the peripheral face of drum 2 is mounted, under radial tension, a flexible, collapsible, radially extensible, magnetizable band 28 which is provided with a helical groove or thread 30 on its outer surface. The elastic record band 28 may comprise a homogeneous mixture of rubber and a finely divided ferromagnetic material. It may be molded in the form of a separable tube which can be stretched over the drum 2, or it may be molded directly on the drum. The thread 30 may be formed at the time the band 28 is molded or it may be cut if the band is initially prepared in the form of a plain tube. As shown in Fig. 4, the thread serves as a lead screw which is engaged by the groove follower 32 attached to the transducer carriage 34 to move the transducer 35 across the record member 28 during both recording and reproducing operations. When the thread is engaged by the follower the pole-pieces 36 of transducer 35 ride on the land of the thread. In order to ensure satisfactory tracking, the pole-pieces may be made wider than the land which constitutes the record portion of band 28.

The record-reproducing head carriage 34 is supported on and guided by the rods 38 and 40 which are disposed in the bail 42. The recording-reproducing head is moved toward the record band 28 when the bail is actuated by the solenoid 44. When this occurs the follower 32 falls into the helical groove or thread on the rotating record band and the head is advanced along the band. While the head traverses the band, signals may be recorded on or reproduced from the land traversed by the pole-pieces of the recording-reproducing head. When the solenoid 44 is released the bail is moved away from the record band by means of the spring 46, the follower is withdrawn from the groove, the recording-reproducing head is lifted from the land of the record member by the arm 47 attached to the follower 32, and the recording-reproducing head carriage is returned to its initial position by means of the spring 48.

The record band which comprises two message sections 50 and 52 separated by a guard section or area 54 has particular utility when employed in a device of the type which automatically answers a signal from a calling party and transmits a recorded message to said party. The band is so devised that message area 50 may be reserved for fixed information e.g., the acknowledgement of the signal from the calling party and the identification of the called party, and message area 52 may be reserved for information which is to be revised at frequent intervals.

The temporary messages recorded in section 52 may be erased by means of an iron coil 56 which is energized by 60-cycle current and held near the record band 28 for one revolution. The coil 56 may be moved toward and away from the record band by means of the solenoid 58 in a manner similar to that disclosed in patent application of J. Z. Menard Serial No. 250,860 filed October 11, 1951.

The guard area 54 which separates the fixed message area 50 and the temporary message area 52 is of sufficient width to prevent erasure of the fixed message when the temporary message is erased.

Figure 2:
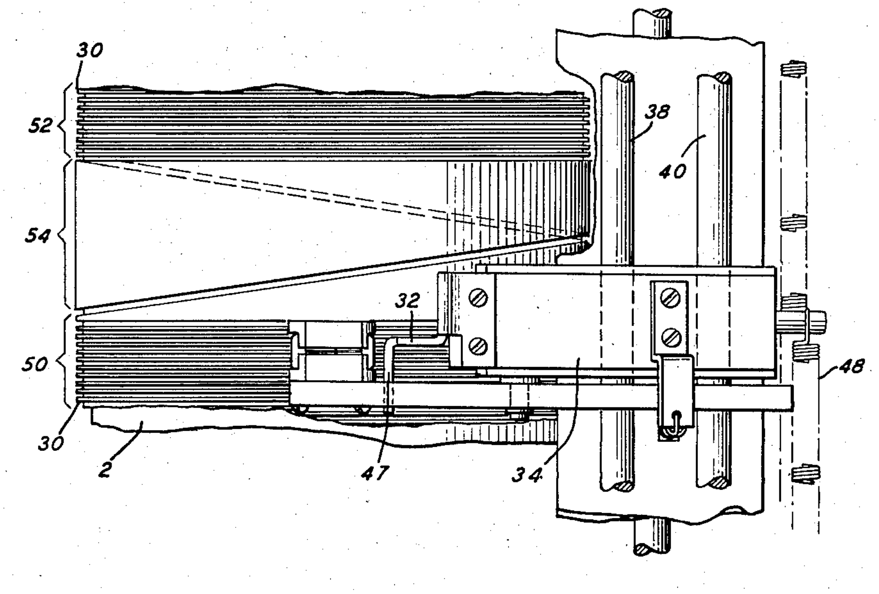
Fig. 2 is a fragmentary plan view of the record medium and transducer shown in Fig. 1.
Figure 3:
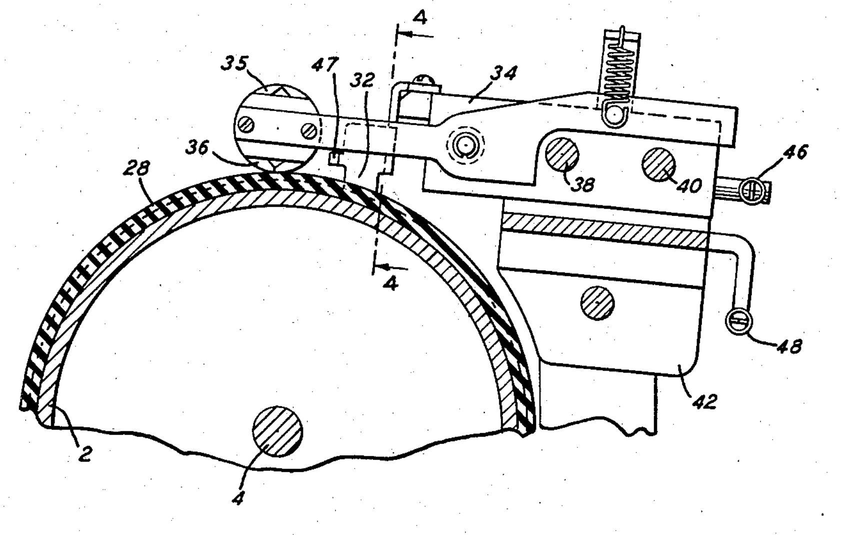
Fig. 3 is a view in front elevation of the record medium and transducer shown in Fig. 2.

The thread 30 is continuous from one end of the band 28 to the other in order to permit uninterrupted travel of the head 35. However, as is clearly shown in Fig. 2, the lead of the thread in the guard area is much greater than the lead of the thread in the sound or message areas 50 and 52. This structural arrangement ensures a minimum time interval between the end of the fixed message in section 50 and the start of the temporary message in section 52.

The utilization of an integral lead screw thread on a record band which can be easily removed from and replaced on a record drum permits of recording on one machine and playback on another. Also, satisfactory tracking of the sound track is assured without the need for external indexing means.

It is to be understood that the above-described arrangements are illustrative of the application of the principles of the invention. Other arrangements may be devised by those skilled in the art without departing from the spirit and scope of the invention.

What is claimed is:

1. A sound recording and reproducing apparatus comprising a rotatable cylindrical drum, a magnetic record member disposed on the peripheral face of said drum, said record member provided on its outer surface with a continuous helical groove, lands between the turns of said groove, a guide member disposed parallel to the axis of said record member, a carriage supported by and movable along said guide member, a groove follower attached to said carriage, said groove follower being adapted to engage and follow said helical groove, a transducer supported by said carriage, said transducer being disposed in such manner with respect to said follower as to be capable of riding said lands when said follower follows said groove, means for causing said follower to engage said groove in said record member, said lands forming a continuous track, said track comprising first and second sound record portions separated by a non-record guard portion, the lead of the groove corresponding to said guard portion being greater than the lead of the groove corresponding to each of said sound record portions to cause said transducer to traverse said sound record portions at a specified speed and said guard portion at a greater speed, means for bulk erasing said second sound record portion, said guard portion being of sufficient width to prevent erasure of said first sound record portion by said erasing means.

2. A sound recording and reproducing apparatus in accordance with claim 1 wherein said record member is flexible, collapsible and radially extensible, and is mounted under radial tension.

References Cited in the file of this patent

UNITED STATES PATENTS

| | | |
|---|---|---|
| 2,361,752 | Eilenberger | Oct. 31, 1944 |
| 2,381,463 | Potter | Aug. 7, 1945 |
| 2,535,480 | Begun | Dec. 26, 1950 |
| 2,550,803 | Goddard | May 1, 1951 |
| 2,668,718 | Roberts | Feb. 9, 1954 |
| 2,672,346 | Roberts | Mar. 16, 1954 |
| 2,712,572 | Roberts | July 5, 1955 |
| 2,734,033 | Menard | Feb. 7, 1956 |

FOREIGN PATENTS

| | | |
|---|---|---|
| 512,766 | Great Britain | Nov. 30, 1937 |